United States Patent
Aries et al.

(10) Patent No.: US 10,926,210 B2
(45) Date of Patent: Feb. 23, 2021

(54) AIR PURIFIER WITH DUAL EXIT PATHS

(71) Applicant: ACCO Brands Corporation, Lake Zurich, IL (US)

(72) Inventors: Paul A. Aries, Brierley Hill (GB); Kaushik I. Patel, Northwood (GB); James Ngai, Aylesbury (GB)

(73) Assignee: ACCO Brands Corporation, Lake Zurich, IL (US)

( * ) Notice: Subject to any disclaimer, the term of this patent is extended or adjusted under 35 U.S.C. 154(b) by 267 days.

(21) Appl. No.: 15/945,090

(22) Filed: Apr. 4, 2018

(65) Prior Publication Data

US 2019/0308122 A1    Oct. 10, 2019

(51) Int. Cl.
*F24F 13/20* (2006.01)
*F24F 13/06* (2006.01)
(Continued)

(52) U.S. Cl.
CPC ..... *B01D 46/0049* (2013.01); *B01D 46/0023* (2013.01); *B01D 46/442* (2013.01);
(Continued)

(58) Field of Classification Search
CPC ............ B01D 46/0049; B01D 46/0023; B01D 46/442; F24F 13/20; F24F 13/082; F24F 2110/64; F24F 2013/205; F24F 3/1603; F24F 13/06; F24F 1/0029; F24F 1/0014; F24F 3/16; F24F 13/28; F24F 13/08; F24F 13/075; F24F 11/89; F24F 11/52;
(Continued)

(56) References Cited

U.S. PATENT DOCUMENTS 5,348,563 A   9/1994   Davis
5,722,484 A   3/1998   Subramanian et al.
(Continued)

FOREIGN PATENT DOCUMENTS

CA    2 485 327    5/2006
CN    2519182      10/2002
(Continued)

OTHER PUBLICATIONS

Press Release, "Speaker", https://www.techpowerup.com/news-tags/Speaker?page=3 (as early as 2004).
(Continued)

*Primary Examiner* — Minh Chau T Pham
(74) *Attorney, Agent, or Firm* — Fitch, Even, Tabin & Flannery LLP (57) ABSTRACT

An air purifier including an air filter, an air movement device configured to move air at least partially in an axial direction and through the filter, and a first exit path in fluid communication with the air movement device. The first exit path is configured such that at least part of the air moved by the air movement device exits the first exit path generally in the axial direction. The air purifier further includes a second exit path in fluid communication with the air movement device and configured such that at least part of the air moved by the air movement device exits the second exit path at an angle of between about 10 degrees and about 45 degrees relative to air exiting the first exit path.

20 Claims, 6 Drawing Sheets

(51) Int. Cl.

| | | |
|---|---|---|
| *F24F 1/0029* | (2019.01) | |
| *F24F 1/0014* | (2019.01) | |
| *F24F 3/16* | (2006.01) | |
| *F24F 13/28* | (2006.01) | |
| *F24F 13/08* | (2006.01) | |
| *F24F 13/075* | (2006.01) | |
| *F24F 11/89* | (2018.01) | |
| *F24F 11/52* | (2018.01) | |
| *F24F 11/64* | (2018.01) | |
| *F24F 1/02* | (2019.01) | |
| *A61B 1/00* | (2006.01) | |
| *B01D 46/00* | (2006.01) | |
| *B01D 46/44* | (2006.01) | |
| *F24F 110/64* | (2018.01) | |
| *A62B 1/00* | (2006.01) | |

(52) U.S. Cl.
CPC ............ *F24F 13/082* (2013.01); *F24F 13/20* (2013.01); *A62B 1/00* (2013.01); *F24F 3/1603* (2013.01); *F24F 2013/205* (2013.01); *F24F 2110/64* (2018.01)

(58) Field of Classification Search
CPC ............... F24F 11/64; F24F 2003/1685; F24F 2013/088; F24F 1/02; F24F 2003/1667; F24F 2003/1628; F24F 2003/1653; F24F 2003/1614; A62B 1/00
USPC ... 55/385.1, 385.7, 358, 422, 467, 471–473, 55/DIG. 34; 96/57, 62, 416, 418, 16, 80, 96/97, 224
See application file for complete search history.

(56) References Cited

U.S. PATENT DOCUMENTS

| | | | |
|---|---|---|---|
| 6,129,781 A | 10/2000 | Okamoto et al. | |
| D496,451 S | 9/2004 | Julos et al. | |
| 6,797,042 B2 | 9/2004 | LaFerriere et al. | |
| D525,691 S | 7/2006 | Russak et al. | |
| D525,692 S | 7/2006 | Russak et al. | |
| D527,086 S | 8/2006 | Russak et al. | |
| 7,201,787 B2 | 4/2007 | Choi et al. | |
| D551,330 S | 9/2007 | Paterson et al. | |
| D561,318 S | 2/2008 | Naksen et al. | |
| D574,476 S | 8/2008 | Spiegel | |
| D588,251 S | 3/2009 | Spiegel | |
| D588,686 S | 3/2009 | Spiegel | |
| D598,532 S | 8/2009 | Dyson et al. | |
| D602,144 S | 10/2009 | Dyson et al. | |
| 7,632,178 B2 | 12/2009 | Meneely, Jr. | |
| D634,417 S | 3/2011 | Abbondanzio et al. | |
| D637,274 S | 5/2011 | Chan et al. | |
| D638,114 S | 5/2011 | Li et al. | |
| 7,938,869 B2 | 5/2011 | Kang | |
| D643,098 S | 8/2011 | Wallace et al. | |
| 8,086,407 B2 | 12/2011 | Chan et al. | |
| 8,252,099 B2 | 8/2012 | Worrilow | |
| D672,023 S | 12/2012 | Wallace et al. | |
| D678,493 S | 3/2013 | Lacotta et al. | |
| D678,992 S | 3/2013 | Choi et al. | |
| 8,685,328 B2 | 4/2014 | Okano et al. | |
| 8,771,599 B2 | 7/2014 | Funabiki et al. | |
| 8,783,663 B2 | 7/2014 | Fitton et al. | |
| D716,432 S | 10/2014 | Viala et al. | |
| 8,932,028 B2 | 1/2015 | Fitton et al. | |
| D728,092 S | 4/2015 | Poulton et al. | |
| 9,004,858 B2 | 4/2015 | Nicolas et al. | |
| D728,769 S | 5/2015 | Dyson et al. | |
| D729,372 S | 5/2015 | McPherson et al. | |
| D729,921 S | 5/2015 | Poindexter et al. | |
| D729,925 S | 5/2015 | McPherson et al. | |
| D730,506 S | 5/2015 | Poindexter et al. | |
| 9,061,084 B2 | 6/2015 | Ohtsuka et al. | |
| 9,101,030 B2 | 8/2015 | Shen et al. | |
| 9,266,118 B2 | 2/2016 | Iwaki | |
| 9,276,385 B2 | 3/2016 | Kataoka | |
| 9,332,322 B2 | 5/2016 | Niemeyer et al. | |
| 9,347,925 B2 | 5/2016 | Shen et al. | |
| 9,366,449 B2 | 6/2016 | Staniforth et al. | |
| 9,393,338 B2 | 7/2016 | Livchak et al. | |
| 9,453,654 B2 | 9/2016 | Manor | |
| D768,840 S | 10/2016 | Peet et al. | |
| 9,593,861 B1 | 3/2017 | Burnett | |
| 9,676,250 B2 | 6/2017 | Weast et al. | |
| 9,737,842 B2 | 8/2017 | Matlin et al. | |
| 9,739,500 B2 | 8/2017 | Wang | |
| 9,764,623 B2 | 9/2017 | Fruehsorger et al. | |
| 9,777,940 B2 | 10/2017 | Yasutomi | |
| 9,839,872 B2 | 12/2017 | Spartz | |
| 9,857,095 B2 | 1/2018 | Hirakawa et al. | |
| 10,697,665 B2 * | 6/2020 | Jung ................. | B01D 46/2403 |
| 2009/0060710 A1 | 3/2009 | Gammack et al. | |
| 2010/0225012 A1 | 9/2010 | Fitton et al. | |
| 2010/0226752 A1 | 9/2010 | Gammack et al. | |
| 2010/0226769 A1 | 9/2010 | Helps | |
| 2010/0226771 A1 | 9/2010 | Crawford et al. | |
| 2010/0226797 A1 | 9/2010 | Fitton et al. | |
| 2010/0226801 A1 | 9/2010 | Gammack | |
| 2011/0030560 A1 * | 2/2011 | Bohlen ................. | A61L 9/015 96/57 |
| 2011/0110805 A1 | 5/2011 | Gammack et al. | |
| 2012/0031509 A1 | 2/2012 | Wallace et al. | |
| 2012/0033952 A1 | 2/2012 | Wallace et al. | |
| 2012/0034108 A1 | 2/2012 | Wallace et al. | |
| 2013/0028763 A1 | 1/2013 | Staniforth et al. | |
| 2013/0028766 A1 | 1/2013 | Staniforth et al. | |
| 2013/0129490 A1 | 5/2013 | Dos Reis et al. | |
| 2013/0142676 A1 | 6/2013 | Zou | |
| 2013/0234346 A1 | 9/2013 | Staniforth et al. | |
| 2013/0234347 A1 | 9/2013 | Staniforth et al. | |
| 2013/0249122 A1 | 9/2013 | Staniforth et al. | |
| 2013/0249124 A1 | 9/2013 | Staniforth et al. | |
| 2013/0249126 A1 | 9/2013 | Staniforth et al. | |
| 2013/0272858 A1 | 10/2013 | Stickney et al. | |
| 2013/0280061 A1 | 10/2013 | Stickney | |
| 2013/0282185 A1 | 10/2013 | Nishimura | |
| 2013/0309065 A1 | 11/2013 | Johnson et al. | |
| 2013/0309080 A1 | 11/2013 | Johnson et al. | |
| 2013/0323100 A1 | 12/2013 | Poulton et al. | |
| 2013/0336771 A1 | 12/2013 | Dyson et al. | |
| 2014/0017069 A1 | 1/2014 | Peters | |
| 2014/0077398 A1 | 3/2014 | Staniforth et al. | |
| 2014/0084492 A1 | 3/2014 | Staniforth et al. | |
| 2014/0210114 A1 | 7/2014 | Staniforth et al. | |
| 2014/0210115 A1 | 7/2014 | Staniforth et al. | |
| 2015/0306533 A1 | 10/2015 | Matlin et al. | |
| 2015/0354874 A1 * | 12/2015 | Cur ....................... | F24F 3/1603 62/216 |
| 2016/0178586 A1 | 6/2016 | Stark | |
| 2016/0184753 A1 * | 6/2016 | Chu ...................... | F24F 1/0071 96/74 |
| 2016/0238269 A1 * | 8/2016 | Kwon ................. | F24F 13/28 |
| 2016/0245543 A1 | 8/2016 | Saiki et al. | |
| 2017/0130981 A1 | 5/2017 | Willette et al. | |
| 2017/0239607 A1 | 8/2017 | Bohrer et al. | |
| 2017/0246570 A1 * | 8/2017 | Park ...................... | F24F 1/005 |
| 2017/0246572 A1 * | 8/2017 | Park ...................... | F24F 3/1603 |
| 2017/0246579 A1 * | 8/2017 | Mun ................... | B01D 46/442 |
| 2017/0246580 A1 * | 8/2017 | Bae ................... | B01D 46/0047 |
| 2017/0246582 A1 * | 8/2017 | Park ...................... | F24F 11/30 |
| 2017/0248339 A1 * | 8/2017 | Mun ..................... | F04D 29/462 |
| 2017/0284906 A1 | 10/2017 | Xing et al. | |
| 2017/0312557 A1 | 11/2017 | Schuller | |
| 2017/0328591 A1 | 11/2017 | Kelly et al. | |
| 2017/0348455 A1 | 12/2017 | Kim et al. | |
| 2017/0361257 A1 * | 12/2017 | Worrall ........... | F02M 35/02475 |
| 2018/0080676 A1 | 3/2018 | Cho et al. | |
| 2019/0134548 A1 * | 5/2019 | Yoon .................. | F04D 27/002 |
| 2019/0264948 A1 * | 8/2019 | Jung ................. | B01D 46/2403 |
| 2019/0299154 A1 * | 10/2019 | Meirav ................. | B01D 53/30 |

(56) References Cited

U.S. PATENT DOCUMENTS

| | | | |
|---|---|---|---|
| 2020/0003435 A1* | 1/2020 | Bush | F24F 13/08 |
| 2020/0003440 A1* | 1/2020 | Kim | B01D 46/0086 |
| 2020/0158357 A1* | 5/2020 | Son | B01D 46/2411 |

FOREIGN PATENT DOCUMENTS

| | | | |
|---|---|---|---|
| CN | 203107938 | 8/2013 | |
| CN | 103574868 | 2/2014 | |
| CN | 203489376 | 3/2014 | |
| CN | 103764177 | 4/2014 | |
| CN | 103851742 | 6/2014 | |
| CN | 203704251 | 7/2014 | |
| CN | 203858184 | 10/2014 | |
| CN | 203880877 | 10/2014 | |
| CN | 104197482 | 12/2014 | |
| CN | 203990115 | 12/2014 | |
| CN | 104502531 | 4/2015 | |
| CN | 104613545 | 5/2015 | |
| CN | 104613620 | 5/2015 | |
| CN | 303258650 | 6/2015 | |
| CN | 204438433 | 7/2015 | |
| CN | 303331274 | 8/2015 | |
| CN | 105020810 | 11/2015 | |
| CN | 303441376 | 11/2015 | |
| CN | 303441397 | 11/2015 | |
| CN | 105194938 | 12/2015 | |
| CN | 204830339 | 12/2015 | |
| CN | 303481387 | 12/2015 | |
| CN | 204943700 | 1/2016 | |
| CN | 205066011 | 3/2016 | |
| CN | 205090502 | 3/2016 | |
| CN | 303635894 | 4/2016 | |
| CN | 303685209 | 5/2016 | |
| CN | 205299842 | 6/2016 | |
| CN | 205349854 | 6/2016 | |
| CN | 303703609 | 6/2016 | |
| CN | 205533452 | 8/2016 | |
| CN | 105928099 | 9/2016 | |
| CN | 303864212 | 9/2016 | |
| CN | 303900922 | 10/2016 | |
| CN | 205668485 | 11/2016 | |
| CN | 303903379 | 11/2016 | |
| CN | 303961036 | 12/2016 | |
| CN | 303998152 | 1/2017 | |
| CN | 206177917 | 5/2017 | |
| CN | 206469374 U * | 5/2017 | F24F 13/02 |
| CN | 206217583 | 6/2017 | |
| CN | 304246443 | 8/2017 | |
| CN | 304254483 | 8/2017 | |
| CN | 304370956 | 11/2017 | |
| CN | 206742661 | 12/2017 | |
| CN | 304381407 | 12/2017 | |
| CN | 304421791 | 12/2017 | |
| CN | 304421817 | 12/2017 | |
| CN | 304433027 | 12/2017 | |
| CN | 304515675 | 2/2018 | |
| CN | 304525797 | 3/2018 | |
| DE | 202014004521 | 7/2014 | |
| DE | 202014104660 | 12/2014 | |
| DE | 102015210213 | 9/2016 | |
| EA | 0000730850003 | 1/2004 | |
| EA | 0007926270005 | 2/2008 | |
| EA | 0007926270006 | 2/2008 | |
| EA | 0017971500001 | 8/2012 | |
| EP | 3211343 | 8/2017 | |
| GB | 2 327 192 | 1/1999 | |
| JP | 2006-046821 | 2/2006 | |
| JP | 3781760 | 5/2006 | |
| JP | 3788623 | 6/2006 | |
| JP | 2009174790 | 8/2009 | |
| JP | 4397305 | 1/2010 | |
| JP | 4408767 | 2/2010 | |
| JP | 4570528 | 10/2010 | |
| JP | 2011237063 | 11/2011 | |
| JP | 4866468 | 2/2012 | |
| JP | 5053208 | 10/2012 | |
| JP | 5121878 | 1/2013 | |
| JP | 2014020652 | 2/2014 | |
| JP | D1546360 | 2/2016 | |
| JP | 2016152188 | 9/2016 | |
| JP | 6078777 | 2/2017 | |
| JP | 2017062093 | 3/2017 | |
| JP | 6284338 | 2/2018 | |
| KR | 101305772 | 9/2013 | |
| TW | 201608181 | 3/2016 | |
| WO | 2010109944 | 9/2010 | |
| WO | 2014/207629 | 12/2014 | |
| WO | 2015/139837 | 9/2015 | |
| WO | 2016/147429 | 9/2016 | |
| WO | 2017065447 | 4/2017 | |
| WO | 2017190444 | 11/2017 | |

OTHER PUBLICATIONS

Product Information "Cylinder Vent with Holes" (Apr. 2, 2018).
Product Information featuring "True HEPA Filter Air Purifier with Gesture Control, Removing Smoking Dust Pollen and Bad Odors, Perfect for Car Office Desktop and Bedroom (Gray)" by LeadYoung, https://www.amazon.com/Purifier-Gesture-Control-Removing-Smoking/dp/B0721MN664 (as early as Apr. 2, 2018).
Webpage featuring "AP-0111 LC (Portable Air Purifier)", by IDSA, https://web.archive.org/web/20130929103657/http://idsa.org/ap-0111lc-portable-ai r-purifier (Jun. 8, 2012).
Webpage featuring "Best air purifier: Ease your allergies with the best air purifiers from E100", by Bell, Kate Hilpern Lee, http://expertreviews.co.uk/home-appliances/1406008/best-air-purifier-ease-your-a llergies-with-the-best-air-purifiers-from-100 (May 22, 2018).
Webpage featuring "CAIRS Air Purifier", by mmminimal, http://mmminimal.com/cairs-air-purifier/ (as early as Aug. 12, 2013).
Webpage featuring "PlusMinusZero air cleaner", by Appliancist, http://appliancist.com/air_quality/air_purifiers/plusminuszero-air-cleaner.html (Aug. 21, 2009).
Webpage featuring "Water Air and Ice", by Radhika Seth, http://www.yankodesign.com/2013/07/10/water-air-and-ice/ (Jul. 10, 2013).
Webpage featuring "Wynd—The smartest air purifier for your personal space", by Wynd Technologies, Inc., https://www.kickstarter.com/projects/882633450/wynd-the-smartest-air-purifier-for-your-personal-s (as early as Jun. 30, 2016).
Extended European Search Report issued in corresponding EP Application No. 19164760.1 dated Nov. 26, 2019 (11 pages).

* cited by examiner

Figure 8:
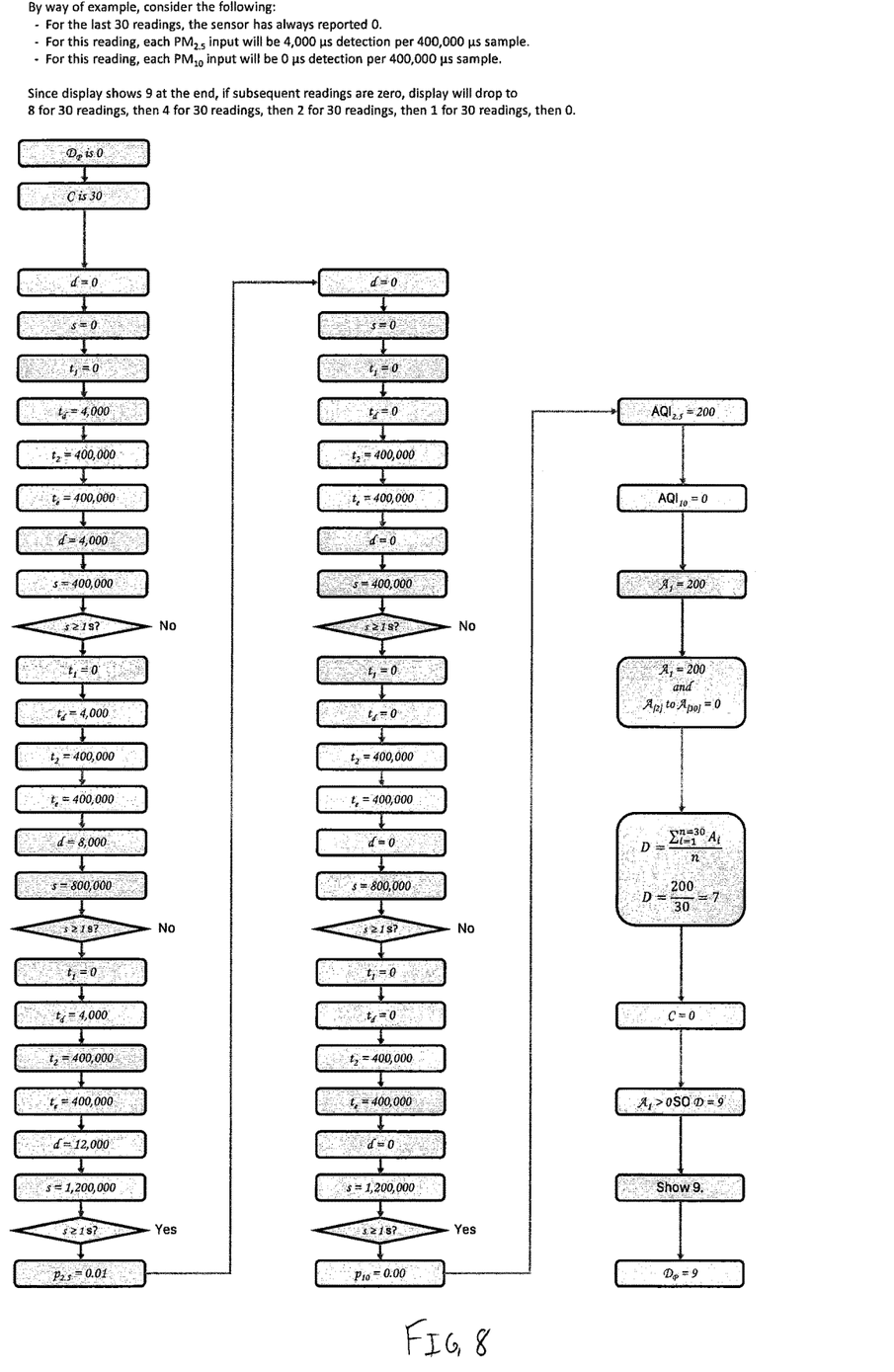
FIG. 8 is a flow chart with specific values showing an example of one iteration of the flow chart of FIG. 7.

By way of example, consider the following:
- For the last 30 readings, the sensor has always reported 0.
- For this reading, each $PM_{2.5}$ input will be 4,000 μs detection per 400,000 μs sample.
- For this reading, each $PM_{10}$ input will be 0 μs detection per 400,000 μs sample.

Since display shows 9 at the end, if subsequent readings are zero, display will drop to 8 for 30 readings, then 4 for 30 readings, then 2 for 30 readings, then 1 for 30 readings, then 0.

FIG. 8

AIR PURIFIER WITH DUAL EXIT PATHS

The present application is directed in one embodiment to an air purifier with two spaced-apart exit paths.

BACKGROUND

Air purifiers are used to remove particulates and impurities from ambient air. Such air purifiers are often positioned at a fixed location in a room and run continuously, or for a set period of time, to improve the air quality. However many existing air purifiers are not configured to ensure an even distribution of the purified air, which can lead to inefficient or prolonged operation.

In addition, existing air purifiers may also include a sensor to detect the quality of the air entering the air purifier. The air purifier may provide an output related to the sensed air quality so that a user can see an indicator of the air quality. However many existing air purifiers provide outputs that significantly fluctuate depending upon air conditions.

SUMMARY

In one embodiment a purifier is disclosed which includes dual exit paths to provide a more even distribution of purified air. In particular, in one embodiment the invention is an air purifier including an air filter, an air movement device configured to move air at least partially in an axial direction and through the filter, and a first exit path in fluid communication with the air movement device. The first exit path is configured such that at least part of the air moved by the air movement device exits the first exit path generally in the axial direction. The air purifier further includes a second exit path in fluid communication with the air movement device and configured such that at least part of the air moved by the air movement device exits the second exit path at an angle of between about 10 degrees and about 45 degrees relative to air exiting the first exit path.

DETAILED DESCRIPTION

Figure 1:
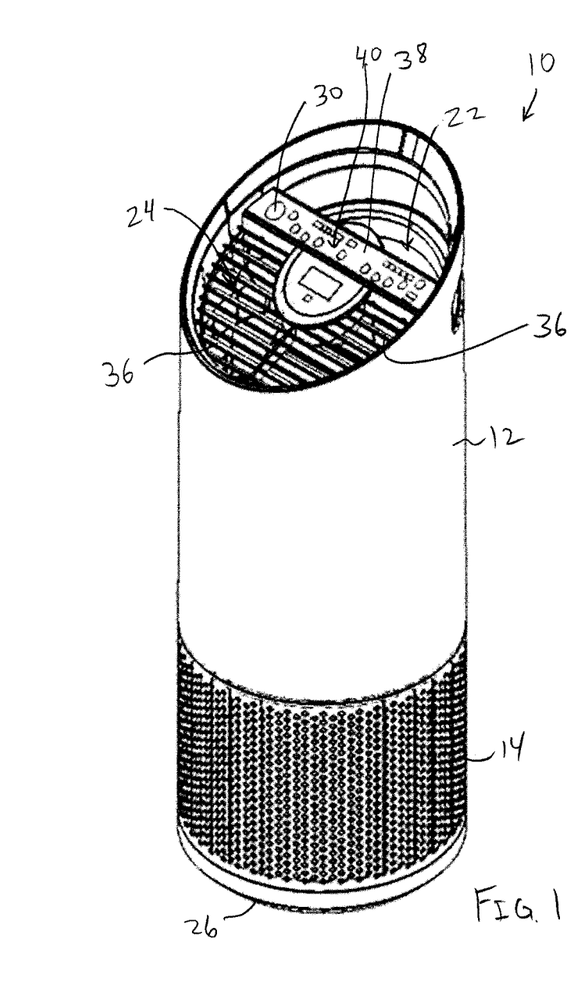
FIG. 1 is a front perspective view of one embodiment of the air purifier of the present invention.
Figure 2:
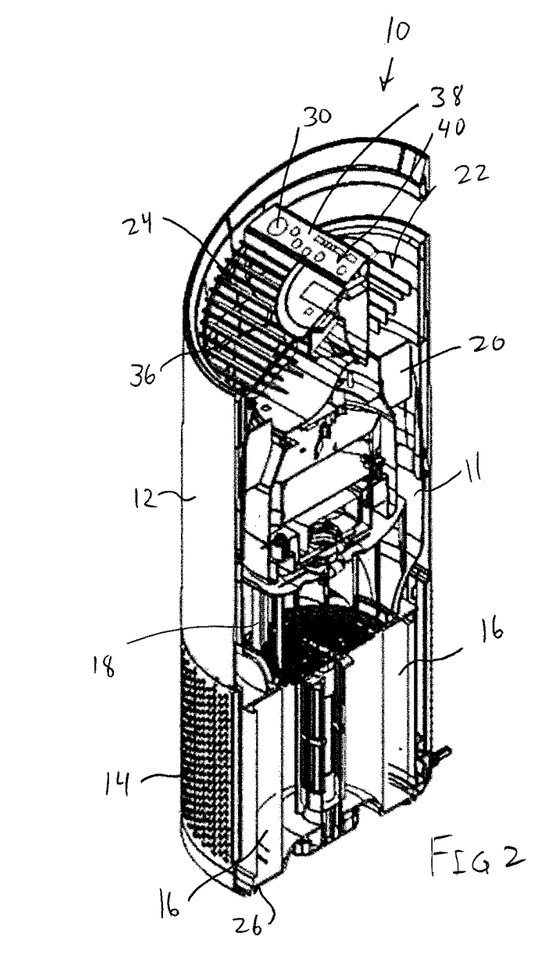
FIG. 2 is a front perspective cross sectional view of the air purifier of FIG. 1.
Figure 3:
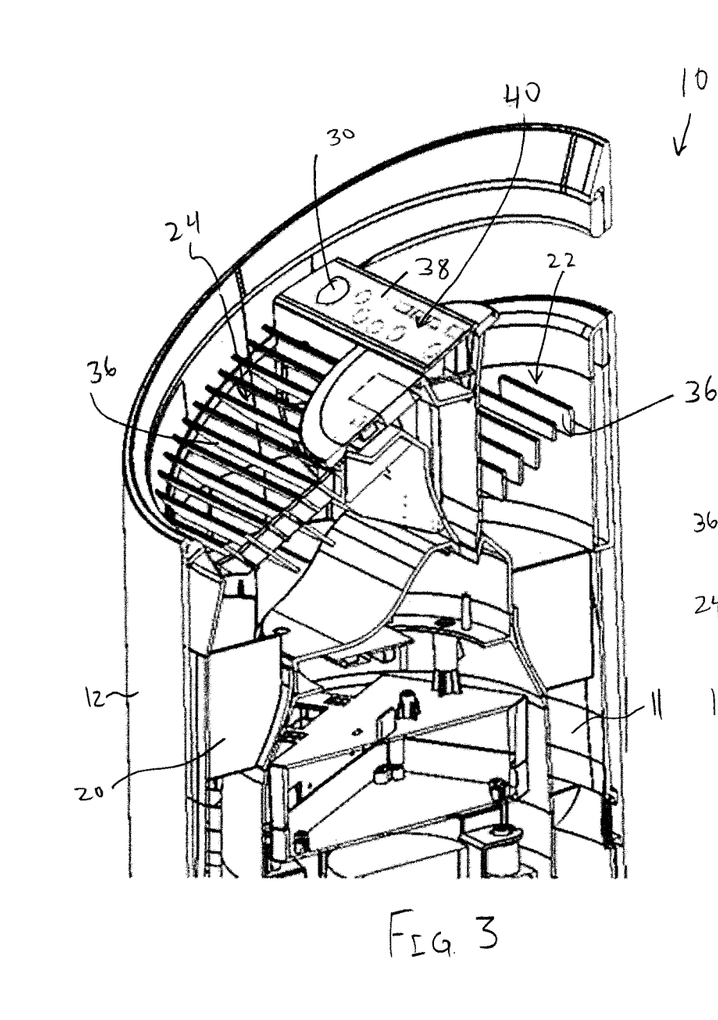
FIG. 3 is a detailed front perspective cross sectional view of the air purifier of FIG. 2.

FIGS. 1-5 illustrate an air purifier 10 that can be operated to remove particulates and impurities from ambient air, thereby improving air quality. With reference to FIGS. 1 and 2, the air purifier 10 can include a housing 12 having a central chamber 11, an air inlet 14, one or more air filters 16 positioned in the chamber 11/housing 12, an air movement device 18 positioned in the chamber 11/housing 12, a flow straightener 20 positioned in the chamber 11/housing 12, and a first 22 and a second 24 air flow exit path positioned at and/or defining an open end of the housing 12. In one embodiment the housing 12 is generally tubular, and more particularly, generally cylindrical. In this case, the housing 12/air purifier 10 can have a generally flat base 26 at a bottom thereof upon which the housing 12/air purifier 10 can be stably positioned.

The air inlet 14 can be positioned adjacent to the base 26, and the exit paths 22, 24 positioned at an opposite end of the housing 12. Each exit path 24, 26 can be in fluid communication with each other and/or with the inlet 14 inside the chamber 11/housing 12, such that both exit paths 22, 24 share the same inlet 14. In this manner, incoming air can be directed generally vertically or axially through the housing 12/air purifier 10 with respect to a gravitational frame of reference when the air purifier 10 is supported on the base 26. The air can also be directed in an axial direction generally aligned with a central axis of the housing 12. In one case the air purifier 10 includes only a single inlet 14 and/or a single air movement device 18.

The air filter(s) 16 can include one or more of a carbon prefilter, a HEPA filter, a UV lamp, a semi-HEPA filter, an ULPA filter, an activated carbon filter, a polarized-media electronic air cleaner, an ionized purifier, an ozone generator or other filtering/purifying components. Each of the air filters 16 can be arranged in series such that the incoming air flow passes through each of the air filters 16 in order. The air purifier 10 also can include a controller 30 which can receive manual inputs and/or automatic inputs to control operation of the air purifier 10, such as operation of the air movement device 18 (e.g. on/off status, various speeds, time of operation, etc.).

The air movement device 18 is positioned downstream of the air filters 16 in the illustrated embodiment, although this order can be reversed if desired. The illustrated air movement device 18 takes the form of an centrifugal fan that, due to the configuration of the fan, housing 12 and other components, directs air at least partially in the axial direction in the housing 12, although any of a wide variety of fans, blowers or the like can be utilized. The flow straightener 20 can be positioned downstream of the air movement device 18, and in the illustrated embodiment includes a plurality of radially extending vanes to reduce a circumferential velocity component of air moved or directed by the air movement device 18. However, it should be understood that the flow straightener 20 can take any of a wide variety of forms, and in some cases can be omitted.

Figure 4:
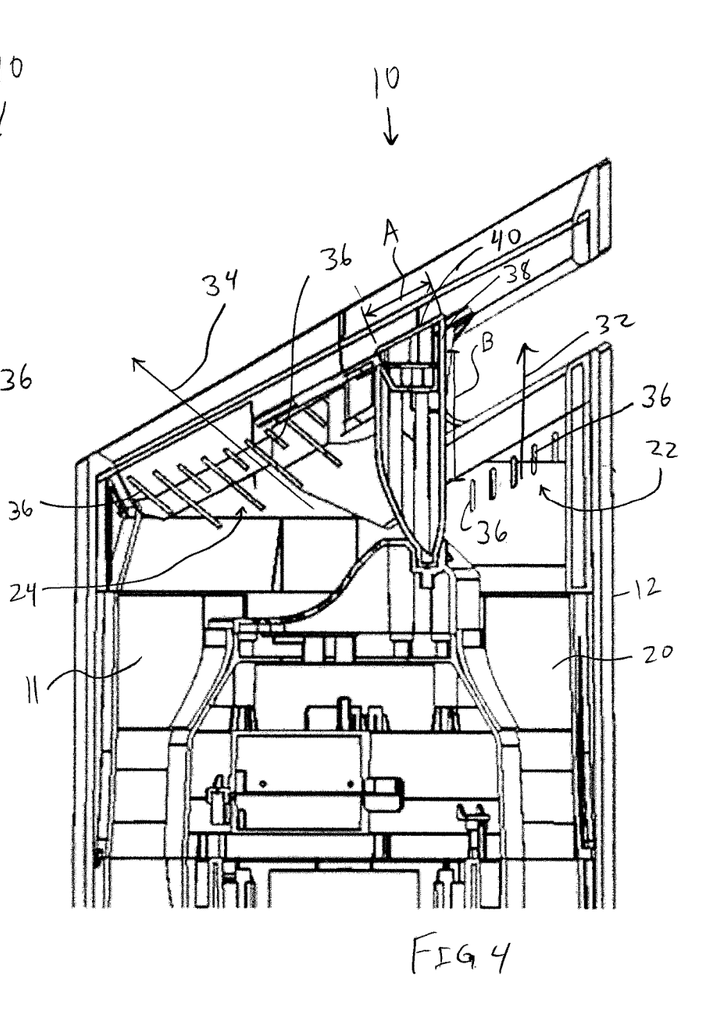
FIG. 4 is a side view of the portion of the air purifier of FIG. 3.
Figure 5:
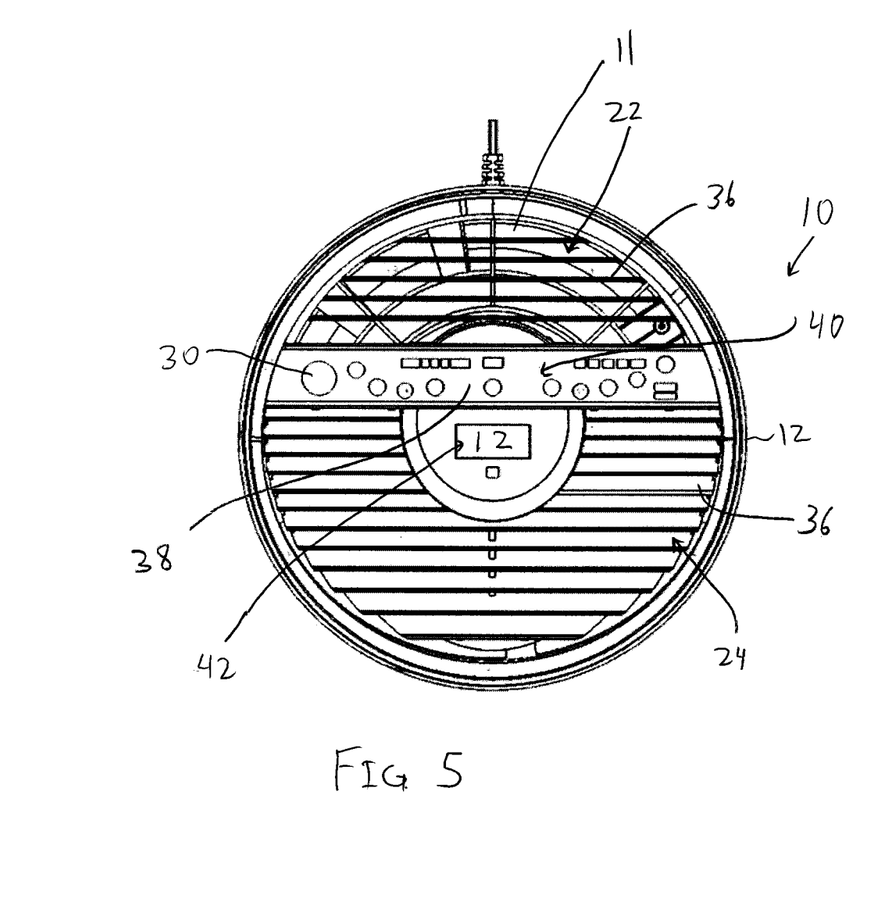
FIG. 5 is a top view of the air purifier of FIG. 1.

The first 22 and second 24 exit paths can be positioned at the upper end of the housing 12 and configured such that all air passing through the housing 12/air purifier 10 exits through the first 22 or second 24 exit paths. However, if desired, one or more additional exit paths (not shown) can be included. Each exit path 22, 24 can be at, or define, a location where air flow exits the housing 12 and is first introduced into the surrounding, ambient atmosphere. The first exit path 22 can be configured such that air exiting the first exit path 22 (e.g. the first air flow 32 with reference to FIG. 4) is directed generally vertically/axially. The first exit path 22 can include a plurality of louvers 36 positioned therein (in the form of generally straight slats, in one case arranged in an angled face/plane as shown in FIG. 4) to direct the air generally vertically/axially as desired. However, besides exiting strictly axially/vertically, the first exit path 22 can be configured such that the first air flow 32 exits at an angle of up to about +/−7.5° to vertical as desired. The louvers 36 associated with the first exit path 22 can similarly be angled between about 7.5° and about −7.5° relative to the vertical/axial direction.

The second exit path 24 can be configured such that air exiting the second exit path 24 (e.g. the second air flow 34 with reference to FIG. 4) is at an angle relative to the vertical/axial direction and/or the first air flow 32. In particular, the second exit path 24 can be configured such that the second air flow 34 exits the housing 12 at an angle at least about 10° relative to the first air flow 32. In one embodiment the second air flow 34 exits the second exit path 24 at an angle of about 30° relative to vertical and/or the first air flow 32, but this angle can vary between about 7.5° and about 45° in one case (or vary between about 7.5° and about 35° in another case).

The second exit path 24 can include a plurality of louvers 36 positioned thereon (in the form of generally straight (but angled) slats arranged in an angled face/plane) to direct the air at the desired angle. The louvers 36 in the second exit path 24 can be at an angle of at least about 5° relative to the louvers 36 of the first exit path 22 to provide a desired separation between the air flows 32, 34. In particular, it may be desired to maintain at least 10° of separation between the first 32 and second 34 air flows, when first exiting the housing 12, to prevent the air flows 32, 34 from merging and combining downstream.

When two discrete but adjacent air flows are formed, an area of low pressure is typically formed between the air flows, and the area of low pressure tends to pull or suck the air flows toward each other, to merge into a single air flow. The disclosed air purifier 10 can be designed such that the first air flow 32 is configured to be directed generally vertically upwardly towards the ceiling of a room (in some cases impacting the ceiling to thereafter spread laterally), whereas the second air flow 34 is configured to be distributed toward the center of the room. Accordingly, since the two air flows 32, 34 have different functions, it is desired to keep them separate and discrete so that they can ensure even distribution of the purified air provided by the air purifier 10. This arrangement of air flows 32, 34 helps to provide efficient distribution of the purified air, and eliminates dead spaces in the associated space/room. The use of the dual exit paths 22, 24 has been found to provide better circulation, reduce dead zones, and reduces the time require to achieve levels of air purification inside a closed space.

In some cases it may be desired to ensure that the differential angle of the louvers 36 and/or corresponding air flows 32, 34 is not too great to ensure that the air flows 32, 34 are distributed throughout the room/surrounding area as desired. Accordingly, in one case the differential angle between the louvers 36 is no greater than about 25°, and the differential angle between the flows 32, 34 is no greater than about 45° in one case, or no greater than about 35° in another case.

The louvers 36 may be fixed in orientation, and not adjustable, to ensure optimal flow conditions are set and maintained. In one case, each of the louvers 36 in the first 22 and second 24 exit paths can have the same, fixed angle with respect to other louvers 36 in the associated exit path 22, 24, or vary by no more than about 5 degrees, to provide the desired predictable flow paths.

As noted above, the differential angle between the air flows 32, 34 may be desired to be at least 10° to prevent the air flows 32, 34 from merging. However, the differential angle between the louvers 36 of the air exit paths 22, 24 may be as low as at least about 5°. The differential angle of the louvers 36 may not always exactly correspond to the differential angle of the air flows 32, 34 due to the volatile nature of air currents and/or any residual circumferential velocity component of the air imparted by, for example, the air movement device 18.

The volume of air flowing through the first 22 and second 24 exit paths can also be configured as desired. In one case, it is desired that at least a majority of the air flowing through the air purifier 10/housing 12 passes through the second exit path 24 since this air is generally directed towards the center of a room and where most users would be located. However, if too much air is directed towards the users/center of the room, an uncomfortable draft may result. In one case, the air purifier 10/housing 12 is configured such that between about 60 and about 80 percent of the air passing through the air purifier 10/housing 12 exits through the second exit path 24, and more particularly about 70 percent in one case (or, stated differently, the volume of air flow through the second air path 24 is at least about 1.5 times greater than the volume of air flow through the first air path 22 and/or less than about 4 times greater). The second exit path 24 can have a volume that is correspondingly larger than the volume of the first exit path 22, in the ranges specified above to accommodate such increased flows.

A flow separator 38 can be positioned between the first 22 and second 24 exit paths to help define and delineate the exit paths 22, 24, and to help keep the air flows 32, 34 sufficiently separated. In particular, the first 22 and second 24 exit paths can be in fluid communication with each other at a position upstream of the separator 38, but the separator 38 helps to divide and provide the two distinct exit paths 22, 24 and air flows 32, 34 so that they can be directed as described above. In one case, the air separator 38 has a lateral dimension A (see FIG. 4 where the lateral dimension extends along the angled plane of the flow separator 38 in the illustrated case) of at least about 40 mm in one case, or at least about 51 mm in another case, to thereby separate the first 22 and second 24 exit paths at the location where the air flows 32, 34 exit the air purifier 10/housing 12. The lateral dimension A can also be equal to at least the dimension between adjacent louvers 36 in the first 22 and/or second 24 exit paths, or at least double or triple the dimension between such adjacent louvers 36. A sufficient size of the lateral dimension A of the flow separator 38 helps to ensure that the air flows 32, 34 are sufficiently spaced apart when exiting the air purifier 10/housing 12 so that they can remain separate and discrete.

In addition, as best shown in FIG. 4, the first 22 and second 24 exit paths can be spaced apart axially by a distance B, at the location where the air flows 32, 34 emerge from the air purifier 10/housing 12 to also help keep the corresponding air flows 32, 34 separate. In one embodiment, the distance B and/or the average axial location of the exit paths 22, 24 differ by at least about 50 mm in one case, and at least about 70 mm in another case. The exit paths 22, 24 may be spaced apart by less than about 30 cm in one case, or less than about 15 cm in another case, or less than about 5 cm in yet another case, in either the lateral and/or vertical direction, to provide exit paths 22, 24 that can be compactly located on the upper face of the housing 12.

An upper/end face of the flow separator 38 can include a user interface or display 40 thereon. The user interface 40 can be operatively coupled to the controller 30 and/or air movement device 18, and the controller 30 operatively coupled to the air movement device 18, so that the user can control the operation of the air purifier 10. Positioning the user interface 40 in this manner helps to provide efficient usage of the surface area of the flow separator 38 and provides convenient access for the user.

The air purifier 10 can include a sensor that is configured to detect air quality and provide an output to the controller 30. In one embodiment the sensor is physically coupled to the housing 12, but alternately could be remotely positioned relative to the housing 12 and wirelessly coupled to the controller 30 (e.g. via Bluetooth® wireless technology standard or other wireless communication protocols). The sensor and/or controller 30 can be configured to provide a user-readable display output 42, in the form of a numerical output in one case (e.g. number "12" in FIG. 5), that is indicative of the sensed air quality. In one case the display/user interface 40 includes an output device such as a LED screen, digital numerical output device, or other display device that can display the display output 42 in a user readable manner.

Figure 6:
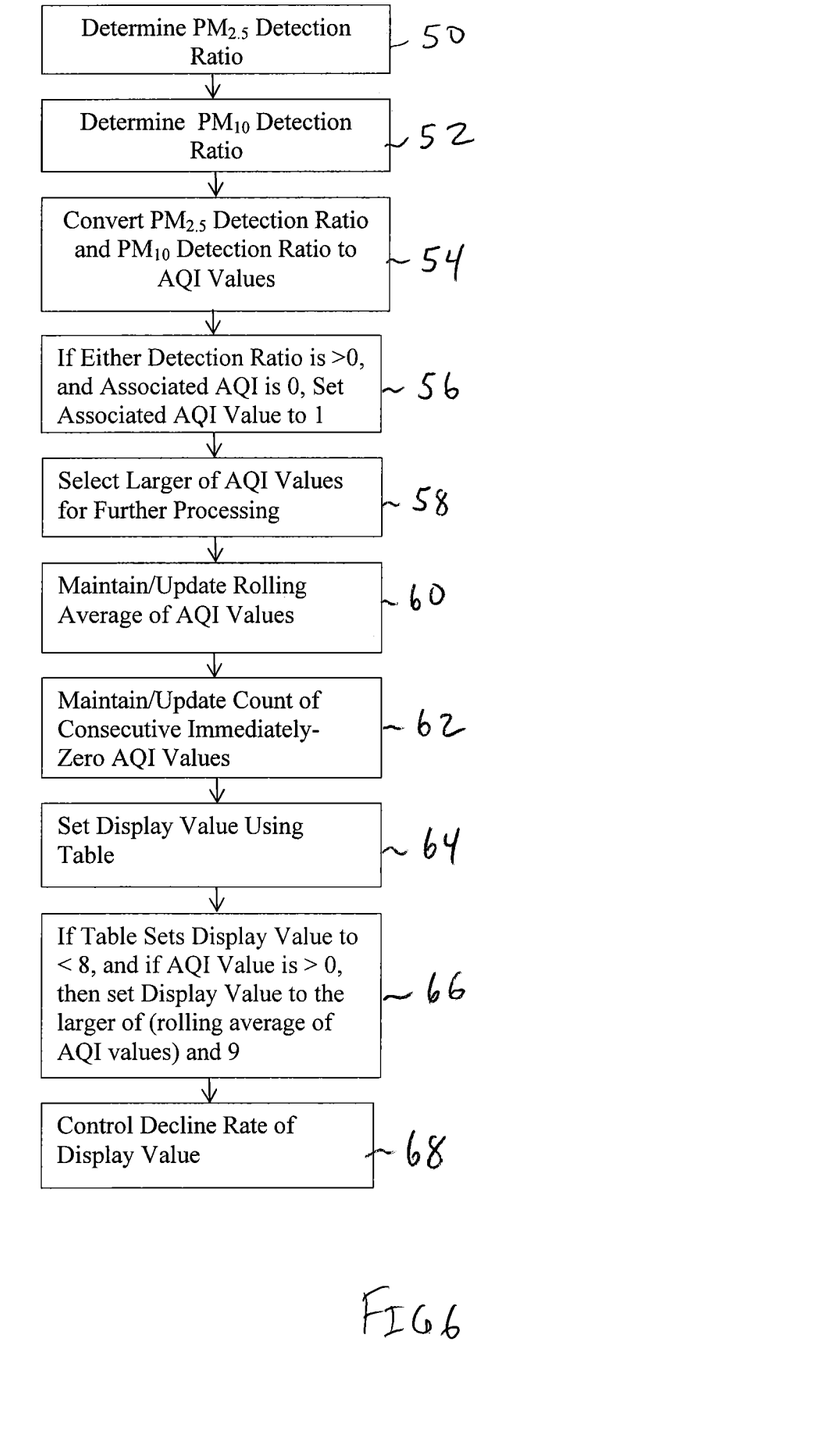
FIG. 6 is a flow chart showing one embodiment of an algorithm for providing a output to a user.

The air purifier 10/sensor/controller 30 can include or access an algorithm for sensing air purity of the incoming air to thereby provide, to the display 40/display output 42, the user-viewable display output or display output value of air quality. A high level summary flow chart showing the method and algorithm is presented in FIG. 6. A more detailed flow chart, expanding upon certain steps of FIG. 6, is provided in FIG. 7. FIG. 8 is a flow chart analogous to that of FIG. 7, with specific values showing an example of one iteration of calculations.

The sensor used in the system and method can provide an output that is a percentage of time that the sensor detects a particle, particulate, impurity or pollution (collectively termed a "particulate" herein) over a period of time. In one embodiment, the sensor can utilize a sensor beam, light beam or the like that is interrupted when a particulate passes through and blocks the beam, allowing the sensor to thereby measure the detection time by referencing an internal clock. For example, in one case as a particular example which will be followed below, the sensor will track for a sampling time of one second. The total sum of time that any particulates block the beam during that interval, and/or the amount of time that a particulate is detected over the sample time of one second, is also tracked (e.g. 20,000 microseconds in one case). In this case, the output of the sensor would be 0.02.

The sensor can be set up to track different sizes of particulates. In one case, the sensor detects first and second particulate sizes over consecutive sampling sequences. Thus, in the example set forth herein shown as step 50 in FIG. 6, the sensor can first sense particulates having a size of 2.5 microns or larger (resulting in a $PM_{2.5}$ detection ratio) over a first sampling time (e.g. one second). Next, at step 52, the sensor detects particulates 10 microns or larger over a second sampling time (e.g. for one second), resulting in $PM_{10}$ detection ratio. For example, in this case, the sensor may detect pollution for 15,000 microseconds, resulting in a $PM_{10}$ detection ratio of 0.015. Thus, when two sizes of particulates are detected, then, the sensing cycle time is doubled (e.g. the cycle time is 2 seconds in the illustrated embodiment). For the sake of comparison, carbon emission typically provides particulates around or under 2.5 microns, whereas pollen particulates are typically in the range of about 10 microns. 2.5 micron particulates can be more common in urban environments (and can be less common in rural environments) but can also be considered more harmful.

Since the $PM_{2.5}$ detection ratio necessarily includes particulates that are also 10 microns or larger, the previous (or subsequent) $PM_{10}$ detection ratio is first subtracted from the sensed $PM_{2.5}$ detection ratio at step 50 as part of calculating the $PM_{2.5}$ detection ratio so that particulates having a size 10 microns or larger are not "double counted." Next, as shown at step 54 the $PM_{2.5}$ and $PM_{10}$ detection ratios are used to calculate estimated air quality index ("AQI") values for each detection ratio. AQI is an indexed value set by the United States Environmental Protection Agency, the European Environmental Agency, or other agencies or organizations to report air quality, and varies in one case from 0 to 500. A true AQI calculation is typically largely based upon the weight of pollutants/particulates in a given volume of air. In order to convert a particular detection ratio to an estimated AQI value, the algorithm first multiplies the detection ratio by 100 to arrive at an integer percentage; that number is then multiplied by 200 to provide a roughly scaled approximation to a true AQI number on the 0 to 500 scale. Of course other calculations can be used as desired, particularly when differing AQI scales are utilized.

Continuing with the example above, the $PM_{2.5}$ detection ratio of 0.02 results in an AQI value of 400 and the $PM_{10}$ detection ratio of 0.015 results in an AQI value of 300. If, for some reason, the calculation results in an AQI value less than zero, then the AQI value is set to zero. At the other end of the scale, if the calculation results in an AQI value greater than the top value on the scale (500 in one case), the AQI value is set at that top value.

Next, at step 56, minimum AQI values are set. In particular, the system examines the $PM_{2.5}$ and $PM_{10}$ detection ratios from steps 50 and 52. If either of the $PM_{2.5}$ or $PM_{10}$ detection ratios is greater than zero, then the associated minimum AQI value is set at one. This step can be useful to avoid conveying to the user that the air quality is perfect, when in fact some particulates are detected. This step also helps to accommodate for any rounding errors that may present an unrealistic picture of high air quality. In the example set forth herein, there is no need to set the minimum AQI value since the AQI values of 300 and 400 are both greater than zero.

Next, as shown at step 58, the larger of the two AQI values is selected for further processing. Continuing with the example above, the larger AQI value of 400 would be selected for further processing and the unselected AQI value of 300 would not be utilized in the remainder of the algorithm except as otherwise specified. By separating out the $PM_{2.5}$ and $PM_{10}$ values, and utilizing the higher value, subsequent calculations can be made based upon whichever particulates are more prevalent to provide accurate feedback.

Next, as shown in step 60, the system maintains and updates a rolling average of AQI values. In the particular example, the rolling average takes into account the last thirty AQI values. Since, as outlined above, each exemplary sensing period takes place over two seconds, in this case the rolling average maintains AQI values for the last sixty seconds. Of course, the number of samples taken into consideration for the average AQI reading can be varied to be greater or less than 30. The selected value should balance the need to reflect recent changes in air quality while maintaining some continuity to avoid rapid fluctuations. For the particular example set forth herein, the rolling average of AQI values is set at 325 for illustrative purposes.

Next, as shown in step 62, a "count" is maintained, where the count is a value of consecutive immediately-previous zero AQI values. Thus, if the most recent determined AQI value was non-zero, the count is set to zero, even if previous readings were zero. In the example set forth herein, since the previous AQI value was greater than zero (400), then the "count" would be zero.

Next, as shown in step 64, an initial value for the displayed numerical output is calculated based upon the Table 1 as set forth below:

TABLE 1

| Value of Count (of consecutive zero AQI values) | Display Output - Select the Larger of: |
| --- | --- |
| 0-29 | (rolling average of AQI values) and 8 |
| 30-59 | (rolling average of AQI values) and 4 |
| 60-89 | (rolling average of AQI values) and 2 |
| 90-119 | (rolling average of AQI values) and 1 |
| 120 or greater | zero |

Continuing with the example set forth herein, since the count is zero, the first row of the table is used to determine the display output value. The display output value would thus be set at the greater of 325 and 8, resulting in a display output value of 325. This table generally allows the rolling average of AQI values to be displayed when the reading is relatively large (e.g. larger than 8), so long as the count is less than 120. Much of Table 1 (e.g. when the count is less than 120) can be considered logically equivalent to retrieving a predetermined display number (e.g. 8, 4, 2, 1) based upon the count, and then determining the display output value based upon the larger of the predetermined display number (e.g., 8, 4, 2, 1) and the rolling average of the AQI. Of course the specific values in Table 1 can be adjusted as desired to accommodate the anticipated conditions and adjust the output accordingly.

Table 1 and its logic ensures that relatively accurate readings can be provided which take into account the last thirty readings (e.g. 60 seconds) to provide a balance between instantaneous and past values. In contrast, as the count of consecutive zero AQI values grows, then the display output value may be forced to be reduced in stepwise fashion as shown in the table. The first four rows of the table can provide adjustments for the sensor showing better than "actual" air quality, to prevent suggesting that air quality is improving faster than is realistic, and thus overcomes some shortcomings of the sensor.

The last row of the table indicates that if there are 120 consecutive zero AQI values, the air quality is presumed to be sufficiently high that the display output is set to zero, regardless of the rolling average of AQI values. This step allows a truly "zero particulate" output to be provided in the correct circumstances, as compared to some other systems that may provide a zero output when the sensor output is only below a minimum threshold, but not necessarily zero. This system and algorithm helps to smooth fluctuations in AQI values that would otherwise be displayed to the user which could result in erratic readings that create confusion to the user. The system and algorithm also provide a balance between rapid spikes based upon short events while smoothing outputs and accurately portraying the detected air quality.

Figure 7:
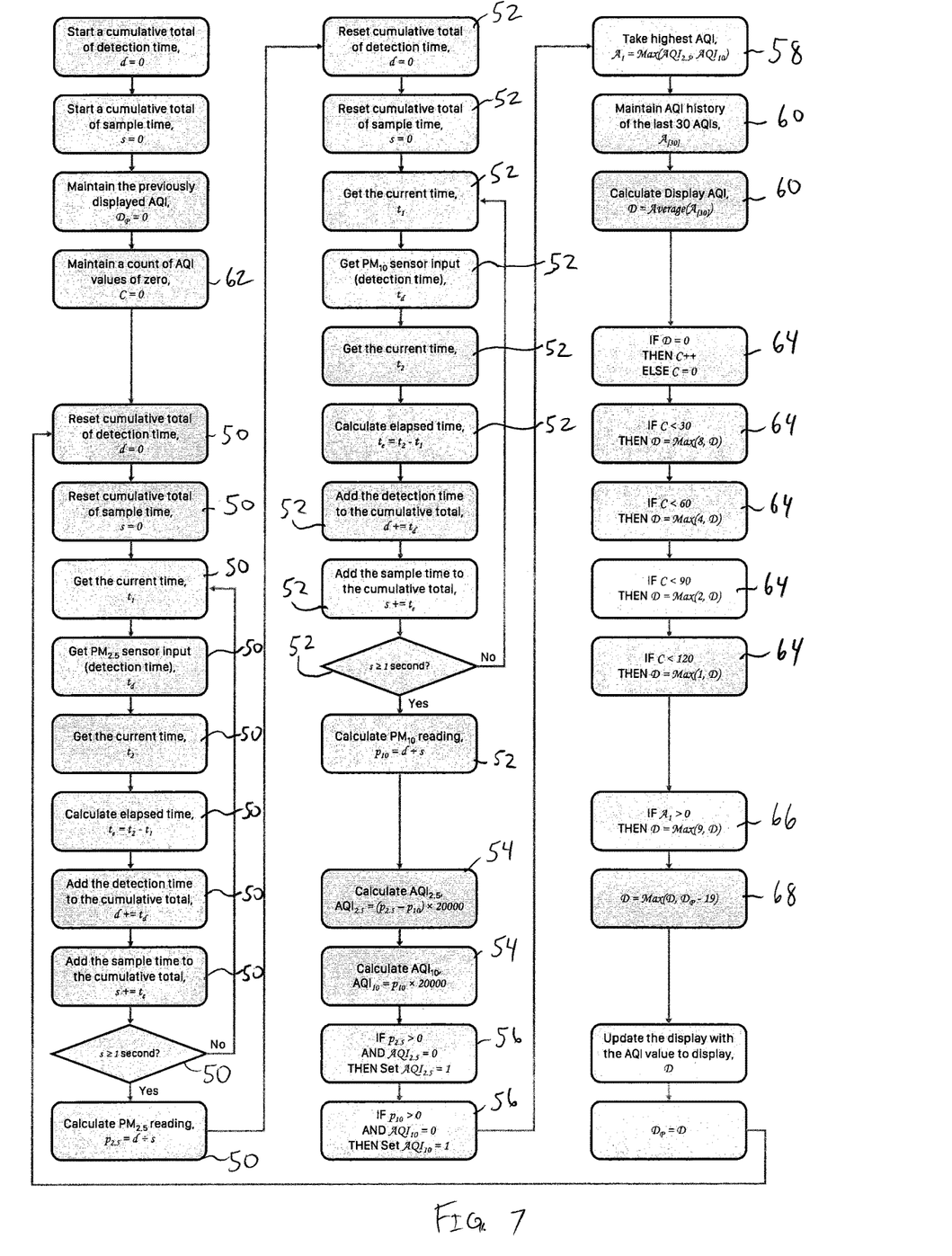
FIG. 7 is a more detailed flow chart expanding upon the algorithm of FIG. 6.

This algorithm can be further supplemented/complimented with additional steps. In particular, as shown in step 66, if Table 1 sets a displayed value of less than 9, but the most recently-sensed, instantaneous AQI (and/or the detection ratio upon which the AQI is based) is greater than zero, then the displayed value is set at the larger of the rolling average of the AQI values, and 9. Of course the value for the threshold, set at nine in this example, can be adjusted as desired. This step can be implemented to emphasize variation and serves two purposes. First, this step helps a user/employee to identify during testing when the displayed value is based upon the AQI value, and when it is detecting zero but reporting on the 8/4/2/1 scale. This may be able to be determined when the display output moves from a value less than 9, to 9. Second, this step helps to vary the displayed number during normal operation to provide a more intuitive user experience. In particular, when the display value jumps from a number less than 9, to 9 as determined by step 66, the user may subsequently see a more normal step-down progression in the display value.

As shown in step 68, the displayed value may be controlled such that each displayed value (i.e. calculated over a two second cycle in the particular embodiment) can decline from the previous value by a maximum value, such as 19 in this case (e.g. a display value of 400 in one reading can be stepped down to a minimum of 381 in the next cycle). This step helps to prevent rapid spikes from appearing and then immediately disappearing which can be confusing to the user. The end value for the display output is, as noted above, then communicated to a display 40 having a user-readable display output 42 to thereby display the display output value. In the illustrated embodiment the display 40 is integrated into the air purifier 10/housing 12. However the display 40 and/or user-readable display output 42 can be positioned remotely from the housing 12, such as a stand-alone output device. In yet another configuration the display 40 and/or user-readable display output 42 can include or take the form of a mobile device, tablet, etc. that has an app downloaded thereon that can communicate with the controller 30 so that the user can conveniently monitor air quality wherever the user is located.

The system, process and algorithm can be stored on or implemented using software, defined herein as one or more computer readable and/or executable instructions or programs that cause a computer/processor/device to perform functions, actions and/or behave in a desired manner. The instructions may be embodied in various forms such as routines, algorithms, modules, methods, threads, and/or programs. Software may also be implemented in a variety of executable and/or loadable forms including, but not limited to, stand-alone programs, function calls (local and/or remote), servelets, applets, instructions stored in a memory, part of an operating system or browser, bytecode, interpreted scripts and the like. The software may be stored on a tangible medium, such as memory, on a hard drive, on a compact disc, RAM memory, flash drive, etc., which tangible medium can exclude signals, such as transitory signals and/or non-statutory transitory signals.

Having described the invention in detail and by reference to the various embodiments, it should be understood that modifications and variations thereof are possible without departing from the scope of the invention.

What is claimed is:

1. An air purifier comprising:
a housing;
an air filter disposed in at least a portion of the housing;
an air movement device configured to move air at least partially through the filter;
a first exit path of the housing in fluid communication with the air movement device and configured such that at least part of the air moved by the air movement device exits the first exit path generally in a vertical direction; and
a second exit path of the housing positioned adjacent the first exit path, the second exit path in fluid communication with the air movement device and configured such that at least part of the air moved by the air movement device exits the second exit path at an angle of between about 10 degrees and about 45 degrees relative to air exiting the first exit path; and
a flow separator positioned between the first exit path and the second exit path, the flow separator configured to promote separation of the air exiting the first exit path and the air exiting the second exit path.

2. The air purifier of claim 1 wherein the first exit path is configured such that air moved by the air movement device exits the first exit path at an angle within about +/−7.5 degrees relative to the vertical direction.

3. The air purifier of claim 1 wherein the second exit path is configured such that air exits the second exit path at an angle of between about 7.5 degrees and about 45 degrees relative to the vertical direction.

4. The air purifier of claim 1 wherein the air movement device is disposed in at least a portion of the housing, and wherein the vertical direction is aligned with a central axis of the housing.

5. The air purifier of claim 4 wherein the first and second exit paths are both in direct fluid communication with the air movement device inside the housing.

6. The air purifier of claim 1 wherein the first and second exit paths each include a plurality of louvers positioned therein about which air is configured to flow, and wherein the louvers of the second exit path are positioned at an angle of at least about 5 degrees relative to the plurality of louvers of the first exit path.

7. The air purifier of claim 1 wherein the second exit path is configured to receive between about 60% and about 80% of an air volume therethrough during operation of the air movement device.

8. The air purifier of claim 1 wherein the first exit path is spaced apart from the second exit path in a lateral direction by a distance of at least about 40 mm.

9. The air purifier of claim 1 wherein the first exit path is spaced apart from the second exit path in the vertical direction by a distance of at least about 50 mm.

10. The air purifier of claim 1 further comprising a user interface operatively coupled to the air movement device and at least partially positioned on the flow separator.

11. The air purifier of claim 1 further comprising a flow straightener positioned downstream relative to the air movement device, wherein the flow straightener is configured to reduce a circumferential velocity component of the air moved by the air movement device.

12. The air purifier of claim 1 wherein the housing includes a central chamber, wherein the air movement device is positioned in the central chamber, and wherein the first and second exit paths are generally fluidly isolated from each other but are both in direct fluid communication with the central chamber.

13. The air purifier of claim 1 wherein the housing has a generally tubular configuration and a generally flat base at a bottom end thereof upon which the housing can be stably positioned, wherein the housing includes an air inlet adjacent to the base, and wherein the first and second exit paths are positioned at an opposite end of the housing relative to the base.

14. The air purifier of claim 1 wherein the air movement device is at least one of a fan or a blower.

15. The air purifier of claim 1 wherein the air filter is positioned upstream of the air movement device.

16. The air purifier of claim 1 further comprising a controller operatively coupled to the air movement device and a sensor configured to sense air quality that is operatively coupled to the controller.

17. An air purifier comprising:
   a housing;
   an air filter disposed in at least a portion of the housing;
   an air movement device configured move air at least partially in an axial direction and through the filter;
   a first exit path of the housing having a plurality of generally axially-oriented louvers; and
   a second exit path of the housing positioned adjacent the first exit path, the second exit path having a plurality of louvers arranged at an angle of at least about 5 degrees and less than about 25 degrees relative the plurality of louvers of the first exit path; and
   a flow separator positioned between the first exit path and the second exit path, the flow separator configured to promote separation of air exiting the first exit path and air exiting the second exit path.

18. The air purifier of claim 17 wherein the air movement device is disposed in at least a portion of the housing, and wherein the first and second exit paths are in direct fluid communication with the air movement device inside the housing.

19. The air purifier of claim 17 wherein the louvers of the first exit path are positioned at an angle of about +/−7.5 degrees relative to the axial direction.

20. The air purifier of claim 1 wherein the housing further includes a handle portion.

\* \* \* \* \*